No. 893,066. PATENTED JULY 14, 1908.
F. J. FLETCHER & W. W. HOCKER.
NUT LOCK.
APPLICATION FILED FEB. 28, 1908.
FIG_1_
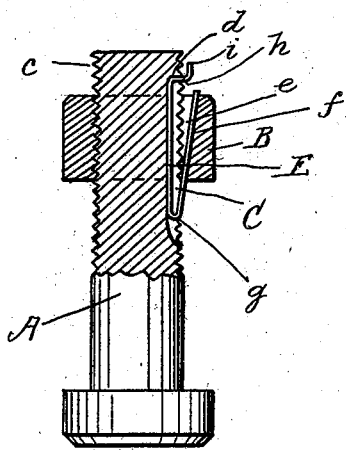
FIG_2_
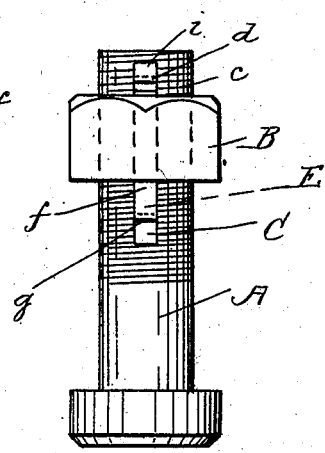
FIG_3_
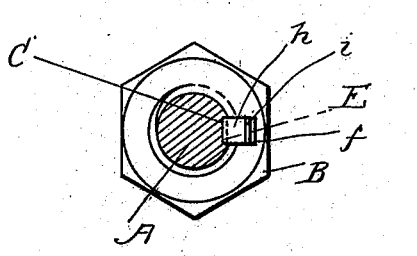
FIG_4_
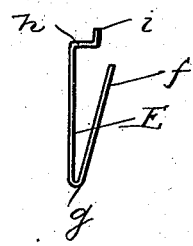
WITNESSES:
L. B. Middleton
H. M. Barrett
INVENTORS.
Franklin J. Fletcher and
BY William W. Hocker.
Herbert W. Jenner
Attorney

UNITED STATES PATENT OFFICE.

FRANKLIN J. FLETCHER AND WILLIAM W. HOCKER, OF COLOMA, MICHIGAN.

NUT-LOCK.

No. 893,066.     Specification of Letters Patent.     Patented July 14, 1908.

Application filed February 28, 1908. Serial No. 418,283.

*To all whom it may concern:*

Be it known that we, FRANKLIN J. FLETCHER and WILLIAM W. HOCKER, residing at Coloma, in the county of Berrien and State of Michigan, have invented certain new and useful Improvements in Nut-Locks; and we do hereby declare the following to be a full, clear, and exact description of the invention, such as will enable others skilled in the art to which it appertains to make and use the same.

This invention relates to locking devices for holding nuts on bolts; and it consists in the novel construction and combination of the parts hereinafter fully described and claimed.

In the drawings, Figure 1 is a longitudinal section through one end portion of a bolt, and its nut, provided with a locking-spring according to this invention. Fig. 2 is a side view of the same. Fig. 3 is an end view of the nut, showing the bolt in section. Fig. 4 is a detail side view of the locking-spring.

A is a screwthreaded bolt of any approved make, and B is its nut. The bolt A has a flat-bottomed groove or key-way C cut in one side of its screwthreaded end portion c. The bottom of this groove is parallel with the axis of the bolt, and the groove has a shoulder d at its upper end.

The nut B has a tapering groove or notch e cut in its screwthreaded portion so that it can register with the groove C, and the deeper end of the notch e is arranged at the top of the nut. As many similar grooves e as desired may be cut in the nut, and more than one groove C may be cut in the bolt, if desired.

E is a locking-spring which is inserted in the grooves C and e from the top of the nut. The groove is made longer than the depth of the nut, so that a portion of it is exposed above the nut when the nut is screwed up.

The locking-spring E has a tongue f which projects from its lower end g, and which is arranged at an acute angle to its main portion. At its upper end the main portion of the locking-spring is provided with a lateral projection h on the same side of it as the tongue f, and which has a lug i at its end. The lug i is substantially parallel to the main portion of the spring, and it projects on the opposite side of the part h from its said main portion.

When the nut is screwed up, and the grooves C and e are in line with each other, the lower end g of the locking-spring is inserted in the upper part of the groove C and is pushed downward until the locking-spring engages with the grooves as shown in Fig. 1. The projection h then comes against the shoulder d, and the point of the tongue engages with the notch e. This prevents the nut from being turned in either direction.

When the nut is to be removed, the main portion of the locking-spring is pulled forward by means of the lug i, which projects from the groove C above the nut, until the projection h is clear of the shoulder d. The locking-spring can then be slid upwardly out of engagement with the said grooves.

What we claim is:

1. In a nut-lock, the combination, with a nut provided with a notch, and a bolt provided with a groove having a shoulder; of a locking-spring formed of a continuous strip of sheet metal of equal thickness and width throughout its length, said strip being bent double to form a spring-tongue at one end, and having its other end portion bent laterally to form a stop and longitudinally to form a lug at the end of the stop.

2. In a nut-lock, the combination, with a nut provided with a notch, and a bolt provided with a smooth-bottomed groove having a shoulder at one end; of a locking-spring formed of a strip of sheet metal of equal thickness and width throughout its length, said strip being bent double to form a spring tongue which engages with the said notch, said strip having an end portion bent over to form a stop which bears against the said shoulder, and having also a lug which projects from the free end of the said stop longitudinally of the main portion of the said strip.

In testimony whereof we affix our signatures, in presence of two witnesses.

FRANKLIN J. FLETCHER.
        WILLIAM W. HOCKER.

Witnesses:
   HENRY S. CRUMB,
   ALLEN W. BAKER.